Patented Feb. 11, 1936

2,030,373

UNITED STATES PATENT OFFICE 2,030,373

DERIVATIVES OF THIAZOLE AND PROCESS OF PREPARING THE SAME

Treat B. Johnson, Bethany, Conn., assignor to Winthrop Chemical Company, Inc., New York, N. Y., a corporation of New York No Drawing. Application August 18, 1932, Serial No. 629,397

2 Claims. (Cl. 260—44)

In my copending application Serial No. 629,396, filed August 18, 1932, I have stated that a variety of thiazole compounds difficult to obtain by other methods can be made accessible by two processes, the first one of which involves the synthesis of thiazole compounds as intermediate products being substituted in the 4-position of the thiazole ring

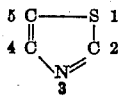

by a halogenated aliphatic radical, which may be substituted by aryl radicals. The second process serves to replace a halogen atom in a thiazole compound as above characterized by an inorganic or organic radical.

In said copending application Serial No. 629,396 the first process for the preparation of said intermediate products, as well as the products themselves, are described, which process comprises reacting a ketone having in its tautomeric enol form the general formula:

$$\begin{array}{c} X\text{--}C\text{--}Hlg \\ \parallel \\ R\text{--}C\text{--}OH \end{array}$$

wherein R stands for a halogenated aliphatic radical which may be substituted by aryl radicals, and wherein X stands for hydrogen or alkyl or aryl or aralkyl, and wherein Hlg stands for either chlorine, bromine or iodine, with a thioamide compound containing the grouping

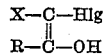

The present application relates to the second process which involves reacting an intermediate halogen containing thiazole compound as mentioned above with a compound containing a reactive hydrogen or alkali metal atom, whereby a halogen atom of the intermediate thiazole compound is replaced by a radical of a compound containing one of said reactive atoms, while a hydrogen halide or an alkali metal salt thereof is split off. The above mentioned variety of thiazole compounds is thus obtainable.

The replacement reaction may be formulated as follows:

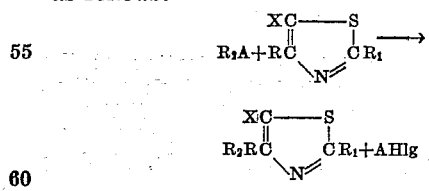

In these formulæ R represents a halogenated aliphatic radical which may be substituted by aryl radicals, $R_1$ represents a large variety of organic radicals such as alkyl, hydroxy alkyl, alkoxy alkyl, aryl, aralkyl, alkyl substituted aryl, hydroxy aryl, alkoxy aryl; the aryl radical standing alone or in any other combination above enumerated may be substituted by various radicals such as hydroxyl, bromine, chlorine, iodine, O-alkyl. In particular, $R_1$ may represent the phenyl group which may contain one or more free or substituted hydroxy groups, which hydroxy groups may be in ortho-, meta- or para-position. $R_2A$ stands for an inorganic or organic compound which has at least one reactive hydrogen or alkali metal atom designated as A. X stands for hydrogen or an alkyl, aryl or aralkyl radical.

The replacement reaction is capable of a wide application. I have found that the thiazole compounds being substituted in the 4-position of the thiazole ring by a halogenated aliphatic radical are comparable in their behavior to alkylhalides or aralkylhalides, as for instance, ethyl chloride or benzylchloride, so that fundamental replacement reactions characteristic of the primary alkyl halide grouping —$CH_2Hlg$ can be applied to said thiazole compounds. It should therefore be understood that a large variety of compounds which contain reactive hydrogen or alkali metal bound either to nitrogen, sulfur, oxygen, or carbon, may undergo the above replacement reaction, such compounds being, for instance, ammonia, potassiumcyanate, potassiumthiocyanate, sodiumsulfite, potassiumhydrosulfide, aliphatic, aromatic or heterocyclic amino compounds which contain a primary or secondary amino group, amide or imide compounds of aliphatic or aromatic carbonic acids, alkali metal salts of aliphatic and aromatic acids such as sodium acetate and sodium benzoate, and alkali metal compounds of aliphatic or aromatic hydroxy compounds such as alcoholates or phenolates and alkali metal salts of the compounds containing a methylene group with two reactive hydrogen atoms such as the esters of malonic acid and higher homologues thereof, or of β-keto-carbonic acid esters containing a methylene group with 2 reactive hydrogen atoms such as aceto acetic acid. The replacement reaction carried out between any one of the above mentioned compounds and a thiazole compound as above characterized leads, under elimination of hydrogen halide, or alkali metal halide, respectively, to thiazole compounds in which the newly introduced substituent is linked by an aliphatic radical with the 4-position of the thiazole ring.

To illustrate potassiumcyanide may be reacted with 2-phenyl-3-chloromethyl thiazole to yield the 2-phenyl thiazole-4-acetonitrile according to the following equation:

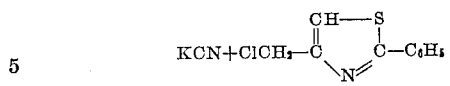

The reaction between the thiazole compound substituted in the 4-position of the thiazole ring by a halogenated aliphatic radical and the compound containing at least one reactive hydrogen or alkali metal atom may be effected by heating the parent materials with or without solvent until the splitting off of hydrogen halide, respectively alkali metal halide, is completed. The resulting new thiazole compounds are generally isolated from the reaction mixture by crystallization or by extraction with a solvent.

The new thiazole compounds characterized by an inorganic or organic radical attached to the 4-position of the thiazole ring by an aliphatic radical either possess as such a definite physiological efficacy which renders them valuable for medicinal purposes, or they may be used as intermediate products for the preparation of physiologically valuable substances.

The following examples serve to illustrate my process and the thiazole compounds which may be obtained thereby:

EXAMPLE 1

*2-phenylthiazole-4-acetonitrile*

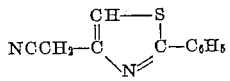

50 grams of 2-phenyl-4-chloromethyl thiazole and 25 grams of potassium cyanide in 65 cc. of alcohol and 35 cc. of water were digested for 4 hours. The inorganic salts were then separated by filtration, the excess of solvent evaporated and the nitrile extracted with ether. It was purified by distillation and boiled at 180–185° C. at 4–5 mm. (Calc., N, 14.00; Found, N, 14.08, 14.14.)

Hydrolysis of this nitrile with hydrochloric acid yields the corresponding acetic acid which melts at 90° C., after crystallization from acetone. This acid thiazole forms a hydrochloride which melts at 206–207° C. (Calc., Cl, 13.8; Found, 13.56.)

EXAMPLE 2

*2-phenyl-4-phthalimidomethyl thiazole*

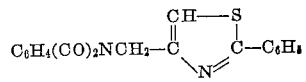

20 grams of 2-phenyl-4-chloromethyl thiazole and 20 grams of potassium phthalimide were heated together in boiling xylene for 5 hours. On adding water to the reaction mixture, an insoluble residue of this phthalimide compound was obtained. It was purified by crystallization from acetic acid and melted at 151–152° C. (Calc., N, 8.75; Found, 8.80.)

EXAMPLE 3

*2-phenyl-4-thiazylmethyl amine*

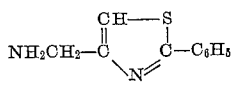

11.6 grams of the above phthalimido compound are warmed with a small volume of alcohol containing 2 grams of hydrazine hydrate. There was an immediate reaction. Dilute hydrochloric acid is then added and the solution warmed at 100° C. for several minutes. Phthalylhydrazide is formed and separates in crystalline condition. The solution is then made alkaline and the above thiazole amine extracted with ether and converted into its dihydrochloride. This deposited in the form of needles melting at 217–218° C. (Calc., Cl, 26.95; Found, 26.45.)

By the action of ammonia on 2-phenylthiazole-4-chloromethyl it is possible to obtain the above primary amine in the form of its hydrochloride in a yield of about 12 grams from 40 grams of the thiazole. The secondary amine

is obtained in a much smaller yield; both of these amines together with the base

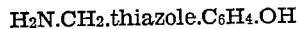

are potent substances when introduced into the animal organism.

The monohydrochloride is formed by drying the dihydrochloride in a warm atmosphere (120° C.). It melts at 188–189° C. (Calc., Cl, 15.58; Found, Cl, 15.51, Calc., N. 12.36; Found, 12.56.) The free amine is an oil which shows no tendency to solidify on standing.

EXAMPLE 4

*Diethyl-2-phenylthiazole-4-methyl-malonate*

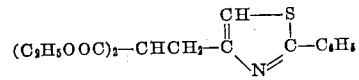

5.75 grams of sodium are dissolved in 120 cc. of absolute alcohol and 40 grams of diethyl malonate added to form its sodium salt. 52 grams of the 2-phenyl-4-chloromethylthiazole were then added when there was an immediate reaction. After warming for 2 hours on steambath, the excess of alcohol was removed by distillation and the malonic ester derivative extracted with ether. On evaporating the ether, the ester remains behind as a solid melting at 112–113° (Calc. N, 4.20; Found, 4.4).

The reaction is characterized by the following equation:

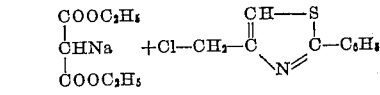

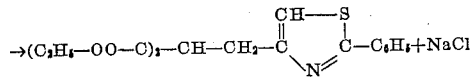

EXAMPLE 5

*2-phenylthiazole-4-methyl-malonic acid*

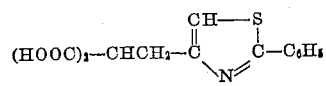

This was obtained by saponification of the above diethyl ester in alcoholic potash solution. It was obtained as a solid melting at 151° with vigorous evolution of carbondioxide, giving the corresponding propionic acid. (Calc. N, 5.08; Found, N, 4.79.)

EXAMPLE 6

*Di-(2-phenylthiazole-4-methyl)-malonic acid*

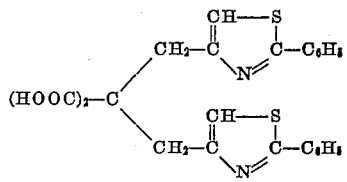

This compound is prepared by treating diethyl malonate in absolute alcohol in the presence of sodium alcoholate with an excess of 2-phenyl-4-chloromethylthiazole as described in Example 4. The resulting diethyl-di-(2-phenylthiazole-4-methyl)-malonate, a crystalline product of the melting point 116° C. is saponified as described in Example 5, yielding di-(2-phenylthiazole-4-methyl)-malonic acid, a crystalline product of the melting point 156–157° C. (Calc. N, 6.22; Found 6.18.)

EXAMPLE 7

*2-p-methoxyphenylthiazole-4-methyl-malonic acid*

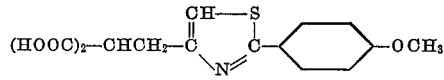

By applying the technique described in Example 4 to 2-p-methoxyphenylthiazole-4-chloromethyl, diethyl-2-(p-methoxyphenylthiazole)-4-methylmalonate is obtained, a crystalline product of the melting point 55–56° C. Upon saponification, it yields 2-p-methoxyphenylthiazole-4-methyl malonic acid, a crystalline product which crystallizes with two molecules of water. It melts at 97° C. (Calc. N, 4.56; Found 4.48.)

EXAMPLE 8

*2-(3.4-dimethoxyphenylthiazole-4-methyl)-malonic acid*

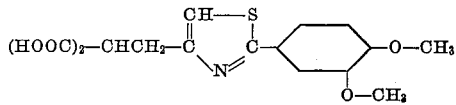

By applying the technique described in Example 4 to 2-(3,4-dimethoxyphenylthiazole)-4-chloromethyl, diethyl-2-(3.4-dimethoxyphenylthiazole)-4-methyl malonate is obtained, a product boiling at 251–255° C. at 2–3 mm. pressure. Upon saponification, it yields 2-(3.4-dimethoxyphenylthiazole-4-methyl)-malonic acid, a crystalline product which crystallizes with one molecule of water. It melts at 141° C. (Calc. N, 4.15; Found 4.10.)

EXAMPLE 9

*2-phenyl-4-phenoxymethyl thiazole*

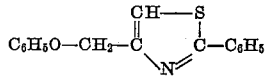

Molecular proportions of phenol (1.4 grams) and sodium ethylate are allowed to interact in alcohol solution at ordinary temperature to form the sodium salt of phenol. To this alcohol solution is then added a molecular proportion of 2-phenyl-4-chloromethyl thiazole and the solution warmed on a steam-bath for 3–4 hours. Sodium chloride is formed and the phenoxy group substituted for the halogen by this treatment. After completion of the reaction, the excess of alcohol is then distilled off leaving the reaction product in the form of a thick oil. On triturating with cold water to dissolve sodium chloride, the thiazole separated in crystalline form and was purified by crystallization from hot 95% alcohol. It melted at 72–73°. (Analysis: Calc. for $C_{16}H_{13}ONS$, N, 5.24; Found, 5.21.)

EXAMPLE 10

*2-phenyl-4-phenylmercaptomethyl thiazole*

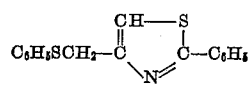

The same technique was employed here as was used in the preparation of the foregoing 2-phenyl-4-phenoxymethyl thiazole except that thiophenol was substituted for phenol in order to obtain the corresponding sodium salt of thiophenol. To an alcohol solution of this sodium salt a molecular proportion of 2-phenyl-4-chloromethyl thiazole (in this case 3 grams) was then added and the solution digested on a steam-bath until the reaction was complete (about 3–4 hours). The excess of alcohol was distilled off after completion of the reaction when a thick oily product was obtained. Trituration with cold water to dissolve sodium chloride led to the formation of a crystalline product in good yield. This new thiazole was then purified by recrystallization from hot alcohol. It melted at 48° crystallizing in prismatic crystals. (Analysis: Calculated for $C_{16}H_{13}NS_2$, N, 4.94. Found, N, 4.90.)

I claim:

1. The thiazole compound of the formula:

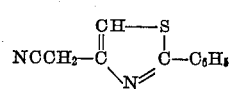

said compound boiling at 180–185° C. at 4–5 mm.

2. A process of preparing a thiazole compound which comprises digesting molecular quantities of 2-phenyl-4-chloro-methyl thiazole and of potassiumcyanide in alcohol, separating the split off inorganic salts by filtration, evaporating the excess of solvent and extracting the reaction product with ether.

TREAT B. JOHNSON.